(12) United States Patent
Cudak et al.

(10) Patent No.: US 10,819,681 B2
(45) Date of Patent: Oct. 27, 2020

(54) CONTENT FILTERING WITH TEMPORARY PRIVILEGE ESCALATION RESPONSIVE TO A PREDETERMINED ENVIRONMENTAL CONDITION

(71) Applicant: Lenovo Enterprise Solutions (Singapore) Pte. Ltd., Singapore (SG)

(72) Inventors: Gary David Cudak, Wake Forest, NC (US); Heather Leah Cudak, Wake Forest, NC (US); Nathan J. Peterson, Durham, NC (US); Bryan L. Young, Tualatin, OR (US); Jennifer J. Lee-Baron, Morrisville, NC (US); John Scott Crowe, Durham, NC (US); Amy Leigh Rose, Chapel Hill, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 371 days.

(21) Appl. No.: 15/939,343

(22) Filed: Mar. 29, 2018

(65) Prior Publication Data
US 2019/0306117 A1    Oct. 3, 2019

(51) Int. Cl.
*H04L 29/06* (2006.01)
*G06K 9/00* (2006.01)
*G06F 16/9535* (2019.01)

(52) U.S. Cl.
CPC ...... *H04L 63/0236* (2013.01); *G06F 16/9535* (2019.01); *G06K 9/00288* (2013.01); *G06K 9/00624* (2013.01); *H04L 63/102* (2013.01)

(58) Field of Classification Search
None
See application file for complete search history.

(56) References Cited

U.S. PATENT DOCUMENTS

| 7,526,541 B2* | 4/2009 | Roese | H04L 41/0893 |
| | | | 709/223 |
| 8,429,708 B1* | 4/2013 | Tandon | G06F 21/00 |
| | | | 380/247 |

(Continued)

OTHER PUBLICATIONS

Alchaita, M.; Nasri, K. Service Availability Routing Mechanism for Mobile Ad Hoc Networks. 2009 Second International Conference on the Applications of Digital Information and Web Technologies. https://ieeexplore.ieee.org/stamp/stamp.jsp?tp=&arnumber=5273962 (Year: 2009).*

(Continued)

*Primary Examiner* — Jeremiah L Avery
(74) *Attorney, Agent, or Firm* — Jeffrey Streets

(57) ABSTRACT

Program instructions are executable by a processor to direct content from a content server to local user devices, and filter the content accessible to each local user device, wherein the content accessible to an individual local user device is filtered according to a current privilege level. The processor may also store a base privilege level for each local user device, and store a predetermined environmental condition for temporary escalation of the current privilege level of the individual local user device to a second privilege level. Still further, the processor may receive environmental data from the individual local user device, wherein the environmental data is captured by an input component of the individual local user device, and temporarily escalate the current privilege level of the individual local user device to the second privilege level in response to the environmental data received from the local user device satisfying the predetermined environmental condition.

20 Claims, 7 Drawing Sheets

(56) References Cited

U.S. PATENT DOCUMENTS

| | | | | |
|---|---|---|---|---|
| 2003/0135611 | A1* | 7/2003 | Kemp | H04L 41/22 709/224 |
| 2005/0222933 | A1* | 10/2005 | Wesby | H04L 67/10 705/36 R |
| 2012/0216243 | A1* | 8/2012 | Gill | G06Q 10/063 726/1 |
| 2016/0080399 | A1* | 3/2016 | Harris | H04L 63/1433 726/23 |
| 2016/0352752 | A1* | 12/2016 | Bush | H04L 63/105 |

OTHER PUBLICATIONS

Ahmed, Shaftab; Raja, M Yasin Akhtar. Integration of Wireless Sensor Network with Medical Service Provider for Ubiquitous e-Healthcare. High Capacity Optical Networks and Emerging/Enabling Technologies. https://ieeexplore.ieee.org/stamp/stamp.jsp?tp=&arnumber=6421447 (Year: 2012).*

Ever, Enver et al. Performability Modelling of a Kerberos Server with Frequent Key Renewal under Pseudo-Secure Conditions for Increased Security. In: 2009 International Conference on the Current Trends in Information Technology (CTIT). https://ieeexplore.ieee.org/stamp/stamp.jsp?tp=&arnumber=5423138 (Year: 2009).*

Lombard, Pierre; Denneulin, Yves. nfsp: a distributed NFS server for clusters of workstations. Proceedings 16th International Parallel and Distributed Processing Symposium. https://ieeexplore.ieee.org/stamp/stamp.jsp?tp=&arnumber=1015512 (Year: 2002).*

* cited by examiner

CONTENT FILTERING WITH TEMPORARY PRIVILEGE ESCALATION RESPONSIVE TO A PREDETERMINED ENVIRONMENTAL CONDITION

BACKGROUND

The present disclosure relates to content filtering for local user devices.

BACKGROUND OF THE RELATED ART

Wireless networks have come into widespread use due to the convenience of being able to access network resources and content without limiting a user device to a specific location. In homes, school and businesses, a wireless network allows user devices to obtain or maintain a network connection as they are moved about within the coverage area of the wireless network.

Although parents, teachers and supervisors may provide a wireless network for certain purposes, they may also wish to place limitations on the content that their children, students, subordinates or guests may access while using the wireless network that they control. Accordingly, content filters have been developed to place limits on the content that can be accessed.

However, content filters can be a challenge to set up in a comprehensive manner. The number of existing websites and their content is constantly changing, such that a simple list of prohibited websites is not entirely effective. New websites and new content may not be filtered as well as content that was previously known about. Furthermore, any given website may have some content that should be filtered and some content that does not need to be filtered. As a result, a content filter that is based on blocking websites by their Uniform Resource Locator (URL) may block more content than intended.

Content filtering by expression matching attempts to block content that include certain predetermined keywords. However, new or creative spellings, or even poor spelling, can lead to inappropriate content getting past the content filter. It is simply very difficult to make a set of content filtering rules that can be applied consistently without also preventing access to some valuable and appropriate content.

BRIEF SUMMARY

One embodiment provides a computer program product comprising non-transitory computer readable storage media having program instructions embodied therewith. The program instructions are executable by a processor to direct content from a content server in an external network to a plurality of local user devices, and filter the scope of the content that is accessible to each local user device, wherein the scope of the content accessible to an individual local user device is filtered according to a current privilege level of the individual local user device. The program instructions are further executable by the processor to store a base privilege level for each local user device, and store a predetermined environmental condition for temporary escalation of the current privilege level of the individual local user device to a second privilege level that is greater than the set privilege level for the individual local user device. Still further, the program instructions are executable by the processor to receive environmental data from the individual local user device, wherein the environmental data is captured by an input component of the individual local user device, and temporarily escalate the current privilege level of the individual local user device to the second privilege level in response to the environmental data received from the local user device satisfying the predetermined environmental condition.

Another embodiment provides a computer program product comprising non-transitory computer readable storage media having program instructions embodied therewith. The program instructions are executable by a processor to store a default address for a local user device in data storage of the local user device, and store a profile for a supervisor in the data storage of the local user device, wherein the profile includes a supervisory device address of a local supervisory user device associated with the supervisor. The program instructions are further executable by the processor to receive current input from one or more input components of the local user device, wherein the current input indicates whether the local user device is in the proximity of the supervisor. Still further, the program instructions are executable by the processor to transmit a current device address and a request for content to a router, wherein the current device address is the default address for the local user device in response to determining that the local user device is not in the proximity of a supervisor, and wherein the current device address is the supervisory device address of the local supervisory user device in response to determining that the local user device is in the proximity of a supervisor.

DETAILED DESCRIPTION

Figure 1:
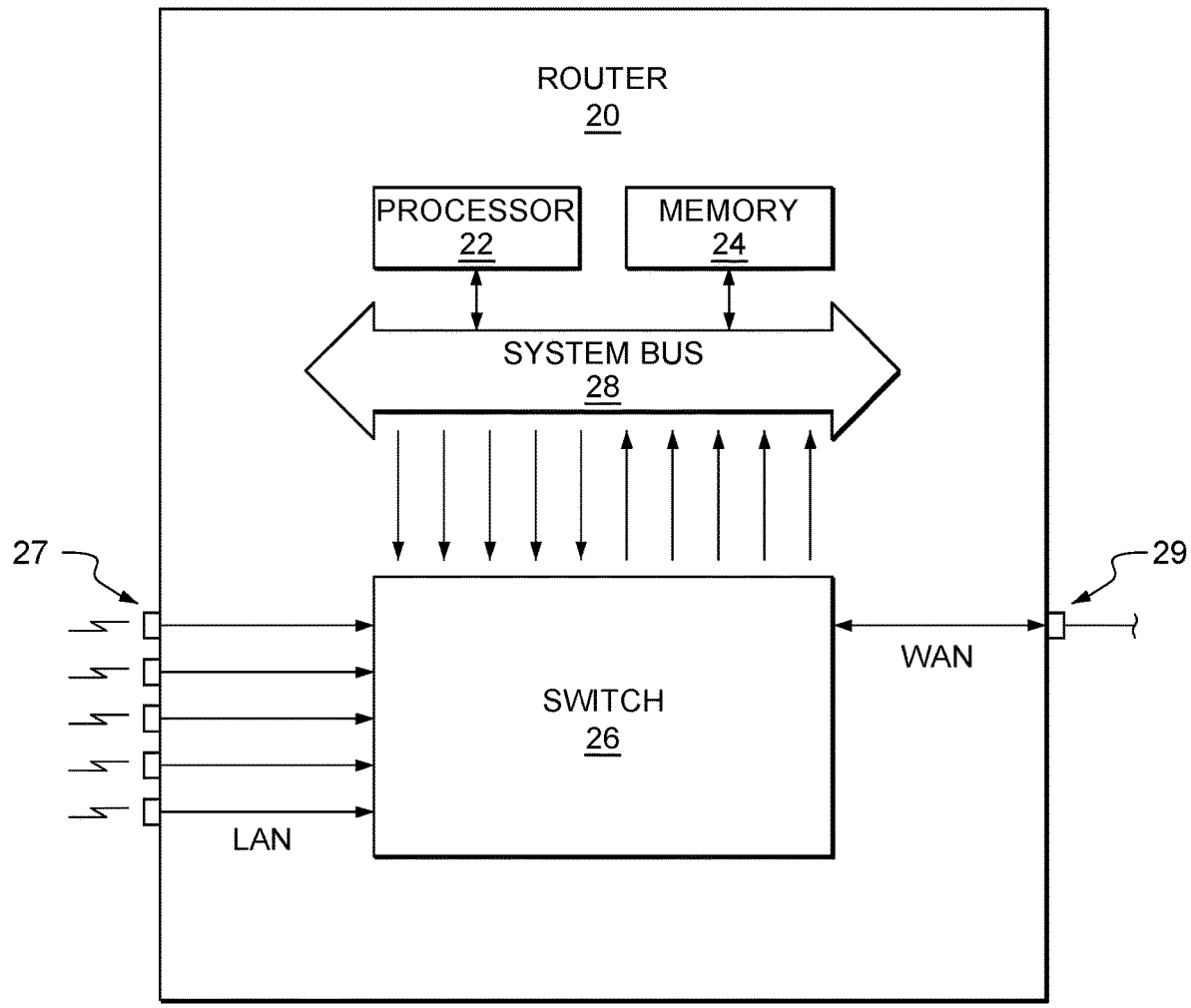
FIG. 1 is a diagram of a router.

One embodiment provides a computer program product comprising non-transitory computer readable storage media having program instructions embodied therewith. The program instructions are executable by a processor to direct content from a content server in an external network to a plurality of local user devices, and filter the scope of the content that is accessible to each local user device, wherein the scope of the content accessible to an individual local user device is filtered according to a current privilege level of the individual local user device. The program instructions are further executable by the processor to store a base privilege level for each local user device, and store a predetermined environmental condition for temporary escalation of the current privilege level of the individual local user device to a second privilege level that is greater than the set privilege level for the individual local user device. Still further, the program instructions are executable by the processor to receive environmental data from the individual local user device, wherein the environmental data is captured by an input component of the individual local user device, and temporarily escalate the current privilege level of the individual local user device to the second privilege level in response to the environmental data received from the local user device satisfying the predetermined environmental condition.

In one example, the program instructions are executable by the processor of a switch or router that forwards data packets between an external network, such as the Internet, and a local area network. Optionally, the program instructions that are executable by a processor to filter the scope of content that is accessible to an individual user device may also be executed by the router or may be executed by an Internet Service Provider (ISP) or Domain Name System (DNS) service in the external network. Although the plurality of local user devices may be connected to the router with cables, the router will preferably support a wireless local area network (WLAN) with wireless connections to the local user devices. Accordingly, a local user device may establish a connection to the router and may request content from a content server in the external network. The scope of the content that is accessible to each local user device may be filtered by blocking content from any specific uniform resource locator (URL) on a prohibited uniform resource locator list or by blocking content that includes any specific expression in a prohibited expression list. In various embodiments, the individual local user device may be prevented from accessing target content at the base privilege level, yet may be allowed to access the target content at the second privilege level. A router or switch may escalate the privilege level for a local user device in various manners, such as by altering the DNS configuration for that individual local user device or adding the IP or MAC address of the individual local user device to a range of addresses that are not filtered.

The predetermined environmental condition may include a predetermined image. Accordingly, if the environmental data received from the individual local user device includes an image that matches the predetermined image, then the environmental data is determined to satisfy the predetermined environmental condition. For example, the image may be the face or other identifier of a supervisor, such as an identification badge or driver's license. Furthermore, the image may be some other unique identifier of a supervisor or a supervised location, such as a one-dimensional bar code or a two-dimensional bar code. The individual local user device may capture the image using a camera included in the individual local user device and may include the image in environmental data that is submitted to the router. The individual local user device may further provide a time stamp indicating when the image was captured, such that the router may determine that the image has been currently captured and the individual local user device is currently in the line-of-sight of the subject of the image. In a further option, environmental data may be received from a network camera that is independent and separate from any local user device. For example, a network camera may be mounted in a predetermined location of a building, such that the presence of a supervisor may be captured in an image. Accordingly, any local user device in the predetermined location of the network camera may be granted privilege escalation in response to the image identifying that the supervisor is present. Furthermore, a network wireless antenna, such a WLAN antennae or a BLUETOOTH short range wireless antennae, may be also be used to detect the presence of a local user device and/or a user device used by a supervisor.

The predetermined environmental condition may include a predetermined identification code, such as an identification code of a predetermined supervisory user device obtained via short range wireless. In this case, the environmental data received from the local user device may be determined to satisfy the predetermined environmental condition in response to the environmental data including an identification code matching the predetermined identification code. For example, the local user device may capture the identification code using an antennae for receiving short range wireless signals, such as a BLUETOOTH signal or radio frequency identification (RFID) signal received directed from another user device. The local user device may then include the image in environmental data that is submitted to the router. Optionally, the local user device may measure proximity to the user device of a supervisor based on the signal strength of the short range wireless signal for the supervisor's user device or based on a response time for a signal to return from the supervisor's user device. The environmental data received from the local user device may provide an identification code along with a time stamp indicating when the identification code was captured. The time stamp can be used to verify that the identification code is currently being received by the local user device (i.e., the local user device is in the presence of the supervisory user device transmitting the identification code) and/or to initiate a time limit for any resulting privilege escalation.

The predetermined environmental condition may require the individual local user device being in the proximity of a local supervisory user device, where proximity is measured as linear distance using global positioning system (GPS) coordinates of two user devices. Both user devices may obtain their location coordinates using a GPS receiver within the user device. In one embodiment, the program instructions are further executable by the processor to receive first location coordinates from the individual local user device, and receive second location coordinates from the local supervisory user device, wherein the individual local user device is determined to be in the proximity of a local supervisory user device in response to the distance between the first and second location coordinates being less than a setpoint distance. In another embodiment, the individual local user device may be determined to be in the proximity of a local supervisory user device in response to the first location coordinates and the second location coordinates being within a predetermined range of location coordinates corresponding to a specific area or room of a building.

Embodiments may include any number of alternative predetermined environmental conditions, such as images or identification codes for a plurality of supervisors and their user devices. For example, a subordinate having a local user device in the presence of a first supervisor may be granted privilege escalation by presenting environmental data including a captured image of a first supervisor. Later, the local user device of the subordinate may be granted privilege escalation by presenting environmental data including an identification code obtained wirelessly from a user device of a second supervisor.

After temporarily escalating the current privilege level of the individual local user device, the current privilege level of the individual local user device may be returned to the base privilege level of the local user device in response to detecting that the individual local user device no longer satisfies the predetermined environmental condition. For example, the local user device may no longer be able to capture images of the supervisor or identification codes associated with the supervisor's user device, such that the environmental data received from the local user device no longer satisfies the predetermined condition. Furthermore, if the environmental data received from the local user device includes an image of the supervisor but the time stamp is not current, then the local user device is no longer determined to be in the presence of the supervisor.

Alternatively, the current privilege level of the individual local user device may be returned to the base privilege level of the local user device in response to expiration of a timeout period since the current privilege level was escalated. For example, upon receiving environmental data from the local user device that satisfies the predetermined condition, the local user device may be granted a temporary privilege escalation for a given time period. At the end of the given time period, if the router, ISP or DNS service does not receive current environmental data satisfying the predetermined condition, then the current privilege level for the individual local user device is returned to the base privilege level.

Still further, the current privilege level of the individual local user device may be returned to the base privilege level of the local user device in response to detecting that the movement of the local user device exceeds a threshold amount of movement. For example, if the local user device is in a first location at the time that it receives privilege escalation, the current privilege level of the local user device may be returned to the base privilege level in response to determining that the local user device has moved to a second location that is separated from the first location by a distance exceeding a predetermined distance setpoint.

In a further embodiment, the program instructions are further executable by the processor to store a privilege level for a local supervisory user device. Upon receiving environmental data from the individual local user device showing that the individual local user device is in the presence of the local supervisory user or the local supervisory user device, the individual local user device may be granted privilege escalation to the privilege level of the local supervisory user device. This is beneficial in various situations, for example so that a subordinate local user device may temporarily access the same content as the local supervisory user device for the purpose of discussion or training.

In various embodiments, the program instructions are further executable by the processor to identify a unique identifier for each local user device that is authorized to connect with the router. The unique identifier is selected from the group consisting of a media access control (MAC) address, an internet protocol (IP) address, and a combination thereof. Still further, the program instructions may be executable by the processor to store, for each local user device, the base privilege level of the local user device in association with the unique identifier of the local user device. In a data structure, the unique identifier and the base privilege level, as well as other data, may be associated by virtue of being stored together in the same record, such as a row of a table where each column may store a different data field. Accordingly, each individual local user device may be assigned an identical or different base privilege level, which may be identified by a lookup in a user database using the unique identifier as a search query. Optionally, a single user database may store a record for each local user device and each local supervisory user device, where each record includes a unique identifier and a privilege level for an individual local user device. Embodiments of the user database may also include a further field storing a profile for each supervisor, where a profile may include unique identifying data that may be captured by a local user device, such as a facial profile or identification codes broadcast by the supervisor's user device in a short range wireless signal.

In a further option, the current privilege level of the individual local user device may be temporarily escalated to the second privilege level by providing a token to the individual local user device or by storing a token in the user database record that is associated with the individual local user device. During a subsequent request for content, the individual local user device can present the token to the router, or cause the router to lookup the token stored in the database, in order to gain access to the requested content using the second privilege level. As used herein, the term "token" means a data point indicating a particular privilege level.

In one non-limiting example, various embodiments may be implemented by a wireless local area network in a high school. Consider that all students and teachers may be "authorized" on the network, but the teachers may be considered to be supervisors that may have a greater privilege level than the students for the purpose of content filtering. However, the current privilege level of a student or other user may be escalated above a base privilege level in response to being in the presence of a teacher or other supervisor. In one option, the current privilege level of the student may be temporarily increased to some preconfigured privilege level, either set by the network administrator or by the teacher whose presence is the basis for the temporary privilege level. Specifically, a student's current privilege level could be increased qualitatively from a base level (predetermined for an "unsupervised student") to a second level (predetermined for a "supervised student"), which may still provide a lesser privilege level than a teacher. Alternatively, a student's current privilege level could be increased quantitatively based on a predetermined scale, such as where low=1 to high=10. For example, the student's base privilege level may be increase by 3 points in the presence of a teacher. In a still further option, the student may temporarily "inherit" the teacher's level of privilege while in the presence of the teacher. Still, the level of privilege assigned to each teacher may vary according to need or subject matter restrictions. For example, human anatomy-related terms, which may typically cause content to be blocked by a content filter that uses expression matching, may not trigger content filtering for a biology teacher.

Other relationships between low privilege users and high privilege users may benefit from temporary privilege increases or escalation in response to a close proximity. For example, a parent may have a high privilege level and the parent's child may have a lower privilege level subject to escalation in the presence of the parent. As another example, a boss, manager or supervisor may have a high privilege level and a subordinate employee may have a lower privilege level that is subject to privilege escalation in the presence of the boss, manager or supervisor. Still further, a landlord or resident may have a high privilege level and a guest may have a lower privilege level subject to privilege escalation in the presence of the landlord or resident. It should be apparent from these examples, that there are numerous types of relationships and situations among network users that may be benefit from temporary network privilege escalation or inheritance.

In yet other embodiments, temporary network privilege escalation may be implemented without articulating the relationships between users. For example, a user's network privilege level may be a function of their seniority or years of service in an organization, such that there are many different levels of privilege (say, in a range from 1 to 35). In other embodiments, any specific authorized network user may experience temporary network privilege escalation in response to being in the presence of another authorized network user that has a level of privilege greater than that of the specific user.

In various further embodiments, a temporary network privilege level that has been granted to a first authorized network user may not be passed through to any other network user. Optionally, a privilege level that a first authorized network user may receive via temporary privilege escalation from a second authorized network user (supervisor) is limited to the base privilege level that is assigned to the second authorized network user by the network administrator.

Another embodiment provides a computer program product comprising non-transitory computer readable storage media having program instructions embodied therewith. The program instructions are executable by a processor to store a default address for a local user device in data storage of the local user device, and store a profile for a supervisor in the data storage of the local user device, wherein the profile includes a supervisory device address of a local supervisory user device associated with the supervisor. The program instructions are further executable by the processor to receive current input from one or more input components of the local user device, wherein the current input indicates whether the local user device is in the proximity of the supervisor. Still further, the program instructions are executable by the processor to transmit a current device address and a request for content to a router, wherein the current device address is the default address for the local user device in response to determining that the local user device is not in the proximity of a supervisor, and wherein the current device address is the supervisory device address of the local supervisory user device in response to determining that the local user device is in the proximity of a supervisor. In this embodiment, the local user device masquerades as the local supervisory user device by using the supervisory device address, such as a hardware MAC address or soft IP address, as the current device address. As a result, the local user device may be granted the same privilege level as the local supervisory user device since the router, switch, ISP or DNS service may not be able to distinguish the local user device from the local supervisory user device.

In another embodiment of the foregoing local user device, the program instructions may be executable by the processor of the local user device to instantiate a virtual network interface card on the local user device using the supervisory device address, and route the request for content and network traffic resulting from the request for content over the virtual NIC using the supervisory device address.

In various embodiments of the foregoing local user device, the current input to the local user device is selected from the group consisting of an identification code received in a short range wireless signal, an identification code received by a radio frequency identification reader, an image received by a camera, and combinations thereof. In one option, the current input is an image received by the camera, where the image is selected from the group consisting of a barcode, a matrix barcode, an identification card and a face. Accordingly, the stored profile for the supervisor includes data representing an image selected from the group consisting of a barcode, a matrix barcode, an identification card and a face.

In one option, the supervisory device address of the local supervisory user device, or any related configuration data, is stored on the local user device in a manner in which the user of the local user device cannot gain access to the data. For example, this data may be encrypted such that only the router, switch, ISP or DNS service may decrypt the data upon receiving the current device address and a request for content from the local user device.

Embodiments of the local user device may process program instructions to alter its own network configuration upon detection of the presence of the supervisory either by spoofing a MAC address on the existing network interface card (NIC) or by using Dynamic Host Configuration Protocal (DHCP) to obtain an IP address from the router, where the IP address is in a range of IP addresses that will be granted a second (escalated) privilege level.

FIG. 1 is a diagram of a router 20. The router 20 includes a processor 22, memory 24, and a switch 26 each coupled to a system bus 28 for communication there between. The switch 26 includes a plurality of ports 27, either wired or wireless, for establishing connections with various local user devices and at least one port 29 for establishing a connection with an external network. The port 29 may be connected to an ISP or DNS service, which provides access to various content servers.

Figure 2:
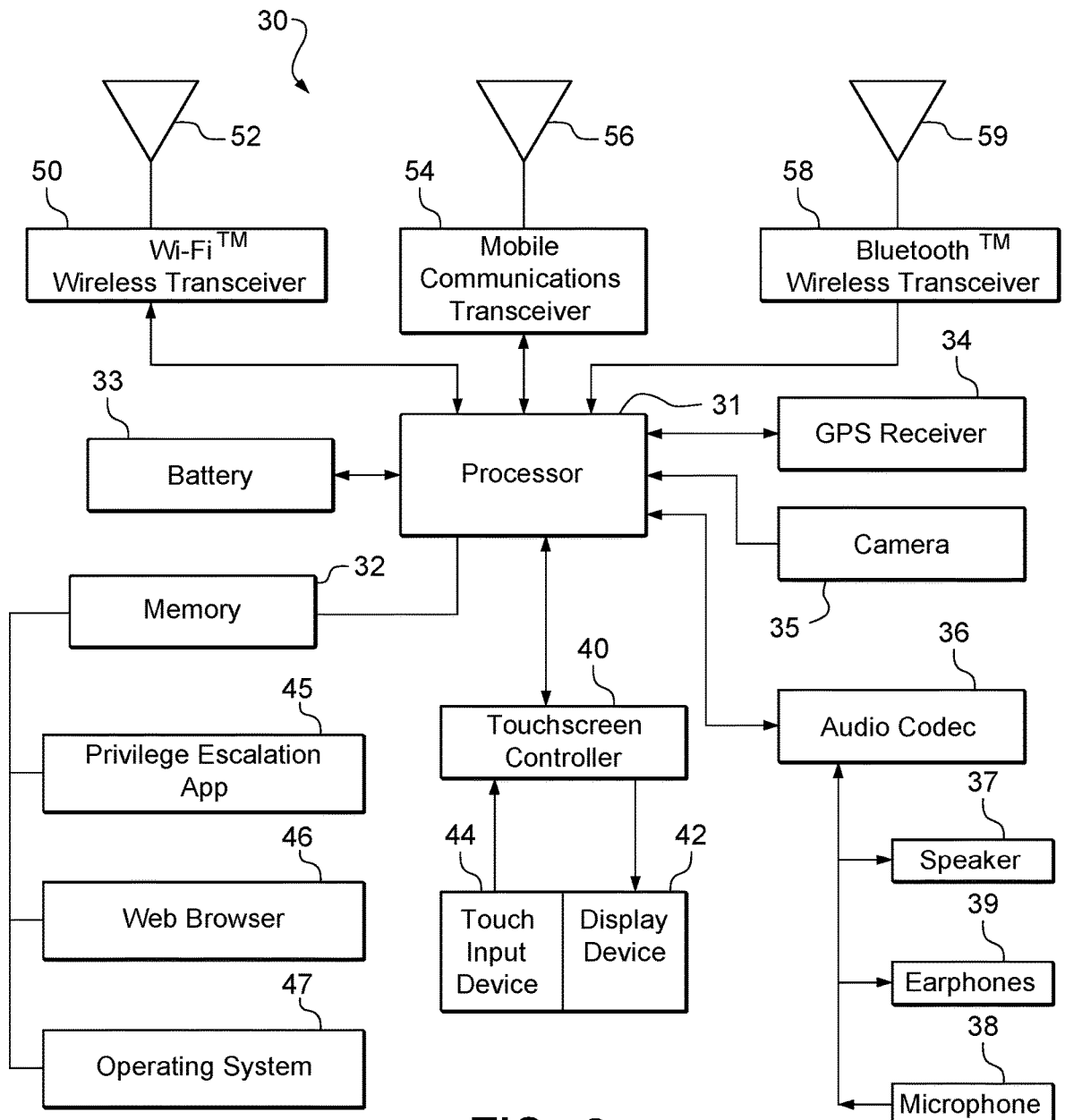
FIG. 2 is a diagram of a local user device.

FIG. 2 is a diagram of a local user device 30, such as a smartphone, tablet computer, laptop computer or other mobile computing device consistent with various disclosed embodiments. The local user device 30 includes a processor 31, memory 32, a battery 33, a global positioning system (GPS) receiver 34, a camera 35, and an audio codec 36 coupled to a built-in speaker 37, a microphone 38, and an earphone jack 39. The local user device 30 may further include a touchscreen controller 40 which provides a graphical output to the display device 42 and an input from a touch input device 44. Collectively, the display device 42 and touch input device 44 may be referred to as a touchscreen.

The local user device 30 may also include a Wi-Fi™ wireless transceiver 50 and corresponding antenna 52, a cellular communications transceiver 54 and corresponding antenna 56, and a Bluetooth™ wireless transceiver 58 and corresponding antenna 59. Accordingly, the Wi-Fi™ wireless transceiver 50 may be used to enable communication with the router 20 shown in FIG. 1. The cellular communications transceiver 54 may be used to enable communication between the local user device 30 and other user devices, such smartphones, over a telecommunication network (not shown). Furthermore, the Bluetooth™ wireless transceiver 58 may, for example, enable communication between the local user device 30 and other local user devices, such as local supervisor's user device, during periods of time that the user devices are in close proximity and able to communicate using short range wireless signals.

In order to implement one or more embodiments, the memory 32 may include a privilege escalation application 45, a web browser 46, and an operating system 47. The privilege escalation application 45 may communicate with a router to establish one or more privilege level for accessing content from the external network. For example, the privilege escalation application 45 may capture an image using the camera 35 or capture an identification code using the Bluetooth™ wireless transceiver 58 and pass the image or identification code to the router as evidence that the local user device 30 is in the physical presence of a supervisor or a supervisor's user device. The web browser 46 may be used to submit a request for content from a content server via the external network connected to the router. Furthermore, the operating system 47 may include network configuration settings, such as a hardware MAC address or software IP address, that identify the local user device 30 to the router, ISP and/or DNS service.

Figure 3:
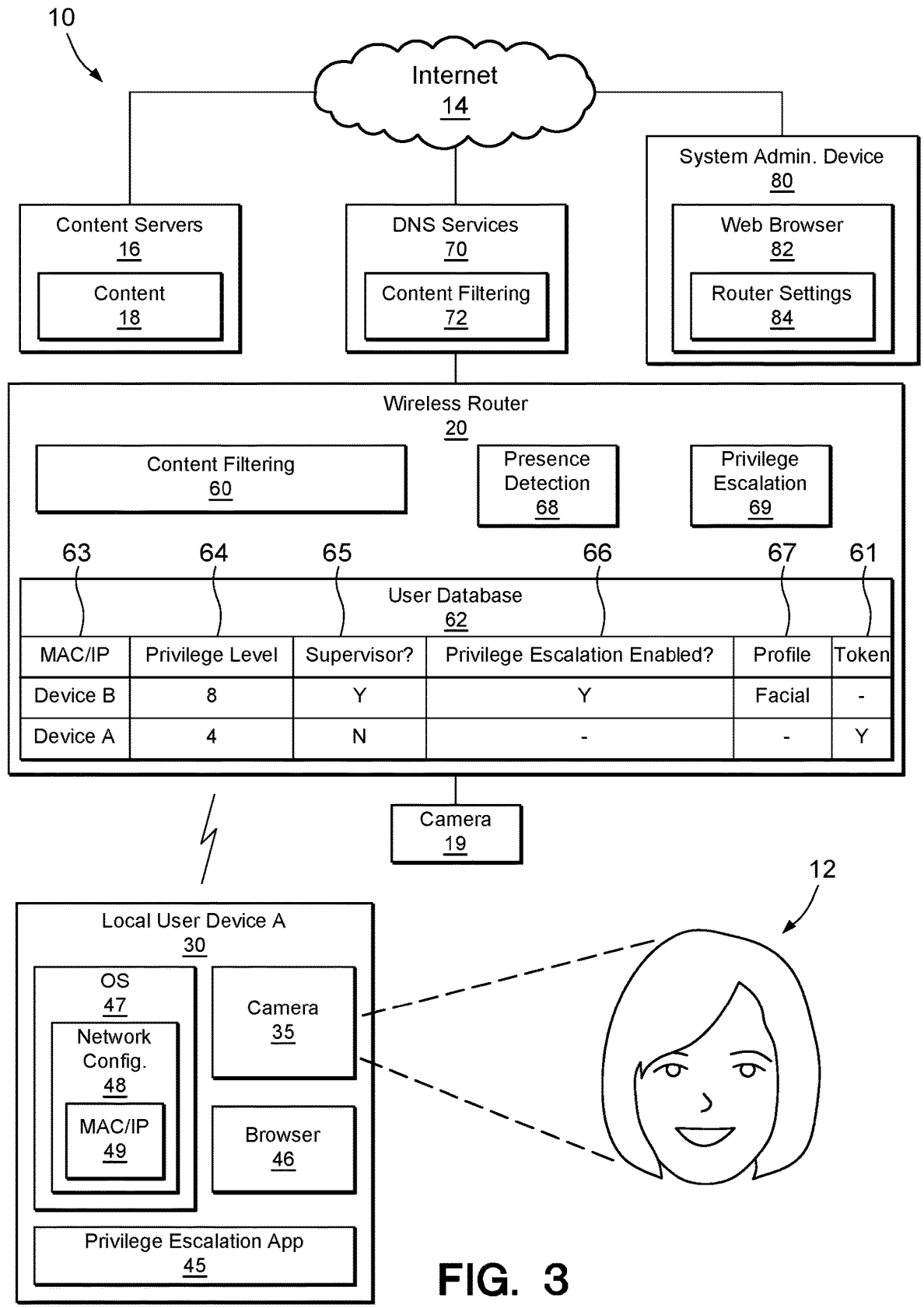
FIG. 3 is a diagram of a system in which a local user device may capture an image of a supervisor to obtain temporary privilege escalation.

FIG. 3 is a diagram of a system 10 in which a local user device 30 may capture an image of a supervisor 12 to obtain temporary privilege escalation. In the example of FIG. 3, a wireless router 20 includes a content filtering application 60 that functions to restrict access to content, perhaps based upon a destination URL or expression matching. Optionally, an ISP or DNS service 70 may also include a content filtering application 72 that may perform some or all of the content filtering functions. Either content filtering application 60, 72 may block access to content based upon a current privilege level assigned to the local user device 30 that is requesting the content.

A system administrator has set up a user database 62 that includes a record for each of plurality of local user devices, including the local user device 30. The system administrator may use a system administration device 80 to interface with the router 20 to set up each record to include relevant configuration data for each local user device. One suitable interface is a web browser 82 using the IP address in the router settings 84 for the router 20.

Each record in the user database 62 may be illustrated as a row in a table, although other data structures are suitable. In this illustration, the data in a single row is "associated" with an individual one of the local user devices. Furthermore, the user database 62 may identify each local user device by a unique MAC address and/or IP address (see column 63). The user database 62 may also store a base privilege level (see column 64) for each local user device in the same record. While each local user device identified in the user database 62 may be an "authorized" user device that has been given the credentials to gain access to the local area network, the authorized user's access network resources or content may be restricted according to their level of privilege (see column 64). In the context of content filtering, a user's privilege level may affect a level of content filtering that is applied to the local user device.

Still further, each record may indicate whether the local user device is associated with a supervisor (see column 65; Y=Yes, N=No). If the local user device is associated with a supervisor, then the record may further indicate whether the supervisor has privilege escalation enabled (see column 66; Y=Yes, N=No), and may store the supervisor's profile (see column 67). A profile for a supervisor may further include either facial data for line-of-site determination or device fingerprint (such as an identification code transmitted by Bluetooth, etc.) for near field communications and proximity determination. In this example, a local user device having a MAC/IP address for a "Device B" (row 1 of the user database 62) is a supervisor (Y in column 65) with privilege escalation enabled ((Y in column 66) and a stored facial profile ("Facial" in column 67).

The individual local user device 30 may store the device's IP address and MAC address 49 as network configuration data 48 in the operating system 47. The IP address and Mac address 49 may be used for routing data between the router 20 and the local user device 30. Furthermore, the router 20 may use the MAC and/or IP address as an index into the user database 62 to determine a privilege level (column 64) associated with the local user device. In this example, the user database 62 includes a record for the local user device 30 ("Device A") that has a base privilege level of "4". Accordingly, a user of the local user device 30 may use the web browser 46 to request content 18 from a content server 16 as identified by a uniform resource locator (URL). Upon receiving the request from the local user device 30, the wireless router 20 and/or the DNS service 70 may perform content filtering 60, 72 based on the privilege level of the local user device. It is possible that the base privilege level of "4" does not prevent the content filtering 60, 72 from blocking some content that is desired by a user of Device A. By contrast, Device B is associated with a privilege level of "8", which may reduce the amount of content blocked by content filtering 60, 72 such that Device B may be able to access from content that Device A was unable to access.

When the local user device 30 ("Device A") is in the presence of a supervisor 12, the privilege escalation app 45 may use the camera 35 of the local user device 30 to capture an image of the supervisor 12, such as the supervisor's face. Then, the privilege escalation app 45 may submit the image, or some relevant data from the image, to the content filtering application 60, 72. The presence detection logic 68 may use image recognition or pattern detection techniques to determine whether the image received from the local user device matches the facial profile. If the presence detection logic 68 determines that the image or relevant data from the image matches the facial profile (see column 67) associated with Device B (see column 63) in the user database 62, then the privilege escalation logic 69 may temporarily grant privilege escalation to the local user device 30 ("Device A"). Depending upon the embodiment, the current privilege of Device A may be temporarily escalated from the base privilege level (see column 64) of "4" to a second privilege level, such as the privilege level "8" associated with the supervisor ("Device B") with the associated facial profile (see column 67). As a result, the local user device 30 may be able to access some of the content 18 that the local user device 30 could not previous access with its own base privilege level.

In various alternatives, the profile (see column 67) associated with a supervisor may include a wireless identification code, a one-dimensional or two-dimensional bar code, or other unique image rather than a facial profile. Still, the data describing the profile may be stored in association with the IP address and/or MAC address for the supervisory user whose presence can provide temporary network privilege escalation.

Optionally, the network router 20 may grant temporary privilege escalation by providing a 'token' to the individual user device, perhaps by altering the network configuration information of the device to provide an IP address that will be subsequently given greater content privileges. Alternatively, the router 20 may store a "token" (see column 61) in the user database 62 in association with the record for the individual local user device, where the token indicates that the user device has been granted a temporary privilege escalation to a specified privilege level.

In a further option, a network camera 19 may be in communication with the router 20 to submit images of a particular area, such as a specific room of a building. Accordingly, the network camera 19 may determine whether a supervisor is present in the particular area, and grant privilege escalation to local user devices determined to be in the same area either by using further facial recognition or short range wireless identification codes.

Figure 4:
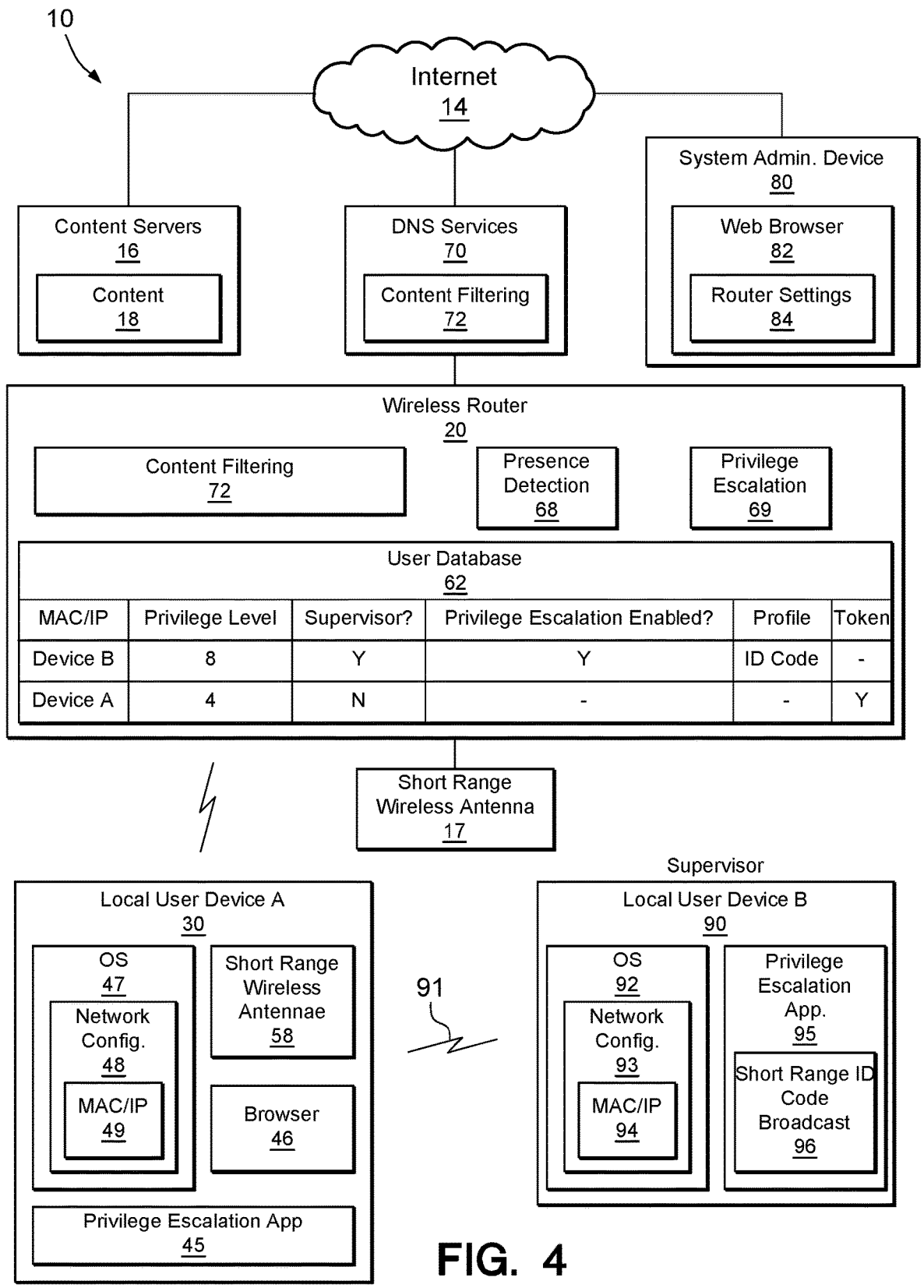
FIG. 4 is a diagram of a system in which a local user device may capture a supervisory identification code via short range wireless from a local user device of a supervisor to obtain temporary privilege escalation.

FIG. 4 is a diagram of the system 10 illustrating an embodiment in which a local user device 30 may capture a supervisory identification code via a short range wireless signal 91 from a local user device 90 ("Device B") of the supervisor (such as supervisor 12 in FIG. 3) and then use the capture identification code to obtain temporary privilege escalation. Like the local user device 30 ("Device A"), the local user device 90 of the supervisor ("Device B") may store the device's IP address and MAC address 94 as network configuration data 93 in the operating system 92. The supervisor's local user device 90 may also include a privilege escalation app 95 that may cause the device 90 to broadcast an identification code 96 via the short range wireless signal 91 when privilege escalation is enabled.

When the local user device 30 ("Device A") is in the presence of the supervisor's user device 90 ("Device B"), the privilege escalation app 45 may cause the short range wireless antennae 58 of the local user device 30 to capture the signal 91 containing the short range identification code associated with the supervisor user device 90. Then, the privilege escalation app 45 may submit the identification code to the content filtering application 60, 72. The presence detection logic 68 may determine whether the identification code received from the local user device matches the ID code stored in the profile (see column 67) associated with Device B (see column 63) in the user database 62. If there is a match, then the privilege escalation logic 69 may temporarily grant privilege escalation to the local user device 30 ("Device A"). Depending upon the embodiment, the current privilege of Device A may be temporarily escalated from the base privilege level (see column 64) of "4" to a second privilege level, such as the privilege level "8" associated with the supervisor ("Device B") with the associated identification code (see column 67). As a result, the local user device 30 may be able to access some of the content 18 that the local user device 30 could not previous access with its own base privilege level.

Optionally, the network router 20 may grant temporary privilege escalation by providing a 'token' to the individual user device or storing a "token" (see column 61) in the user database 62 in association with the record for the individual local user device, where the token indicates that the user device has been granted a temporary privilege escalation to a specified privilege level.

In a further option, a network short range wireless antenna 17 may be in communication with the router 20 to capture and submit short range wireless signals in a particular area, such as a specific room of a building. Accordingly, the network antenna 17 may determine whether a supervisor is present in the particular area, and grant privilege escalation to local user devices determined to be in the same area either by using short range wireless identification codes or facial recognition.

Still further, both user devices 30, 90 may access their GPS receiver (see GPS receiver 34 in FIG. 2) to determine their own location and submit their location to the wireless router 20. The presence detection module 68 may determine that the two device are present in the same location if their locations are within a predetermined distance or if their locations are both within a range of locations, such as a range of locations associated with a particular room or area of a building.

Figure 5:
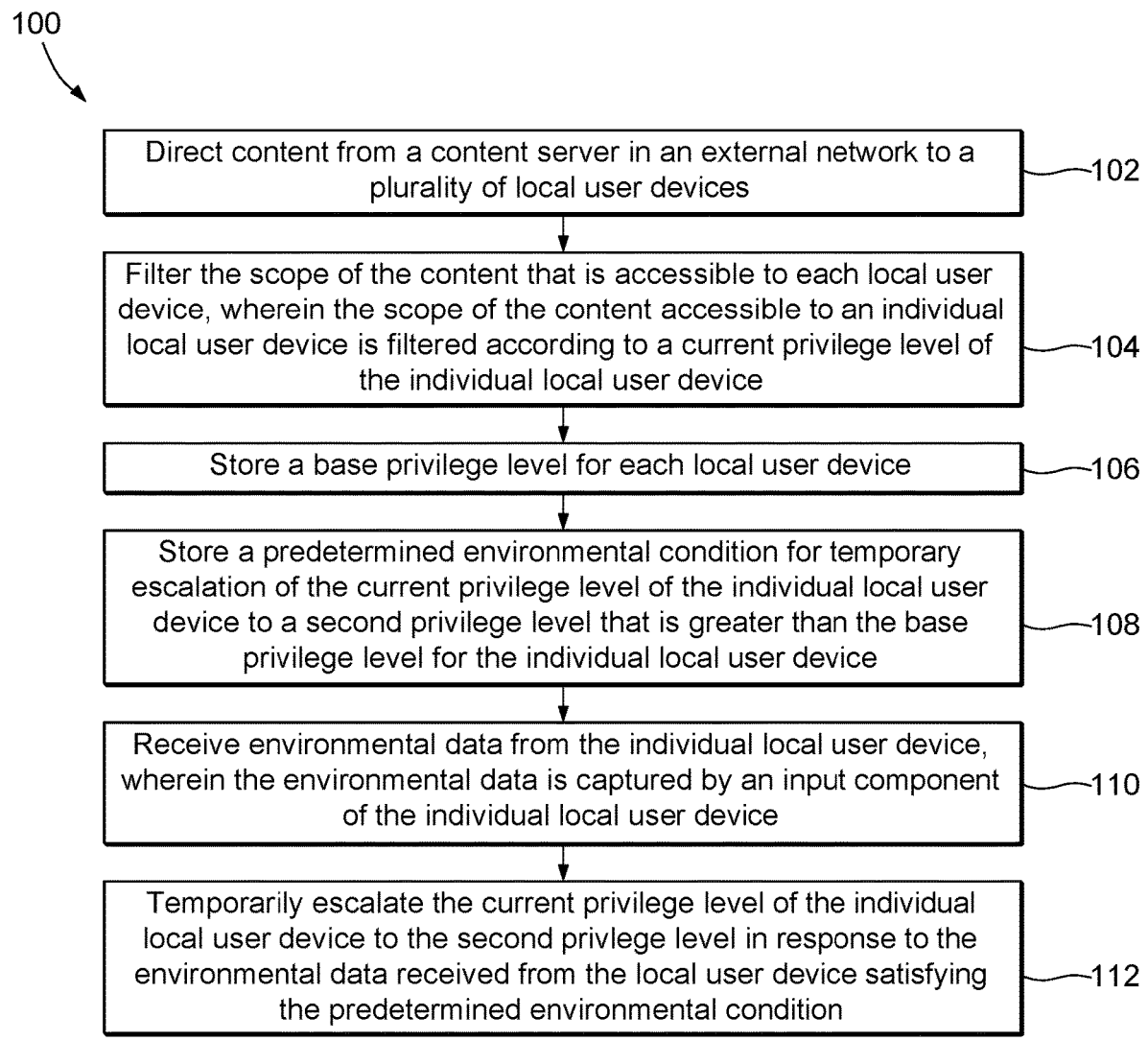
FIG. 5 is a flowchart of a method performed by a router according to one embodiment.

FIG. 5 is a flowchart of program instructions 100 executable by the processor a router according to one embodiment. Instruction 102 is executable by the processor to direct content from a content server in an external network to a plurality of local user devices. Instruction 104 is executable by the processor to filter the scope of the content that is accessible to each local user device, wherein the scope of the content accessible to an individual local user device is filtered according to a current privilege level of the individual local user device. Instruction 106 is executable by the processor to store a base privilege level for each local user device, and instruction 108 is executable by the processor to store a predetermined environmental condition for temporary escalation of the current privilege level of the individual local user device to a second privilege level that is greater than the set privilege level for the individual local user device. Instruction 110 is executable by the processor to receive environmental data from the individual local user device, wherein the environmental data is captured by an input component of the individual local user device. Instruction 112 is executable by the processor to temporarily escalate the current privilege level of the individual local user device to the second privilege level in response to the environmental data received from the local user device satisfying the predetermined environmental condition.

Figure 6:
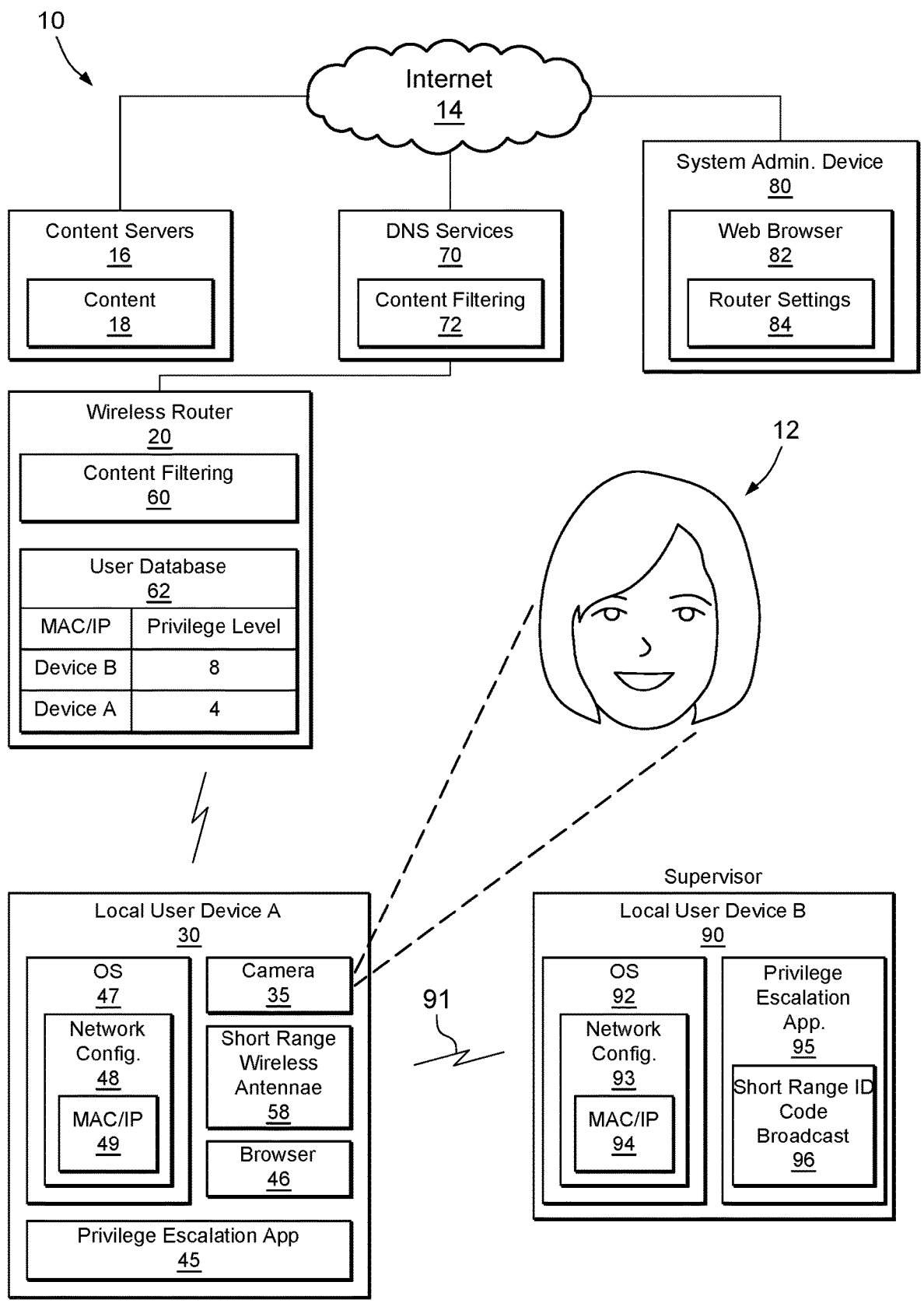
FIG. 6 is a diagram of a system in which a local user device may masquerade as the local user device of a supervisor in response to detecting either the supervisor or the local user device of the supervisor.

FIG. 6 is a diagram of the system 10, illustrating an embodiment in which the local user device 30 ("Device A") may masquerade as the local user device 90 ("Device B") of a supervisor 12 in response to detecting the presence of either the supervisor 12 or the local user device 90 of the supervisor.

The local user device 30 ("Device A") may detect the presence of either the supervisor 12 of the supervisor's user device 90 ("Device B") in any manner previously described, such as using the camera 35 as described in reference to FIG. 3 or using the short range wireless antenna 58 as described in reference to FIG. 4. However, the privilege escalation app 45 on the local user device 30 may store one or more supervisor profiles, such as facial or identification codes, and make its own presence determination based on determining whether data collected by an input device, such as the camera 35 or the antenna 58, matches the one of the supervisor profiles. Upon making a positive determined, the privilege escalation app 45 may cause the local user device 30 to temporarily masquerade as the local user device 90. The device 30 may masquerade as the device 90 by temporarily using the MAC or IP address 94 of the device 90 as that of its own. Accordingly, when the device 30 submits a request for content to the wireless router 20, the local user device 30 identifies itself with the MAC or IP address 94 of the device 90. In this manner, the content filtering 60, 72 will allow access to content using the privilege level "8" associated with "Device B" rather than the base privilege level "4" associated with "Device A."

Figure 7:
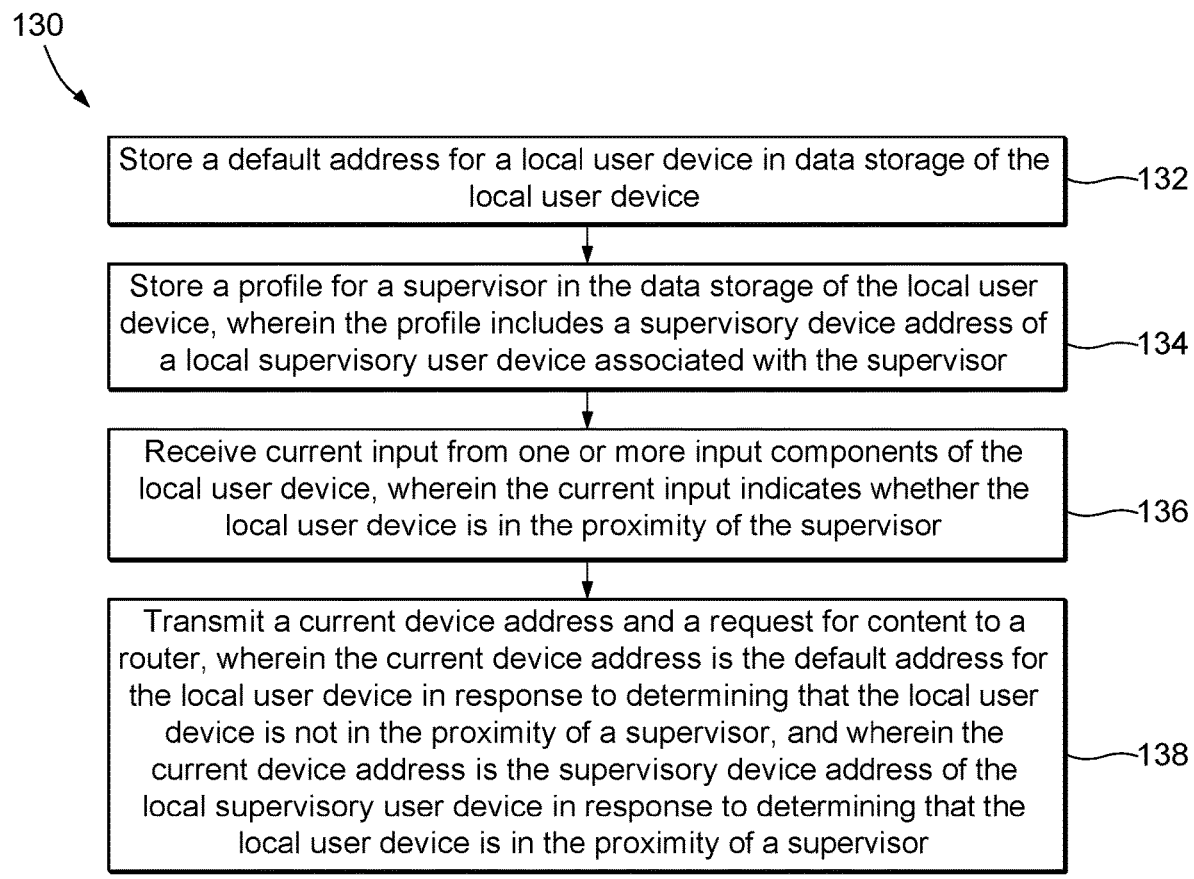
FIG. 7 is a flowchart of a method performed by a local user device according to another embodiment.

FIG. 7 is a flowchart of a program instructions 130 executable by the processor of a local user device according to another embodiment. Instruction 132 is executable by the processor to store a default address for a local user device in data storage of the local user device. Instruction 134 is executable by the processor to store a profile for a supervisor in the data storage of the local user device, wherein the profile includes a supervisory device address of a local supervisory user device associated with the supervisor. Instruction 136 is executable by the processor to receive current input from one or more input components of the local user device, wherein the current input indicates whether the local user device is in the proximity of the supervisor. Instruction 138 is executable by the processor to transmit a current device address and a request for content to a router, wherein the current device address is the default address for the local user device in response to determining that the local user device is not in the proximity of a supervisor, and wherein the current device address is the supervisory device address of the local supervisory user device in response to determining that the local user device is in the proximity of a supervisor.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising non-transitory computer readable storage media having program instructions embodied therewith, the program instructions executable by a processor to:

direct content from a content server in an external network to a plurality of local user devices;
filter the scope of the content that is accessible to each local user device, wherein the scope of the content accessible to an individual local user device is filtered according to a current privilege level of the individual local user device;
store a base privilege level for each local user device;
store a predetermined environmental condition for temporary escalation of the current privilege level of the individual local user device to a second privilege level that is greater than the set privilege level for the individual local user device;
receive environmental data from the individual local user device, wherein the environmental data is captured by an input component of the individual local user device; and
temporarily escalate the current privilege level of the individual local user device to the second privilege level in response to the environmental data received from the local user device satisfying the predetermined environmental condition.

2. The computer program product of claim 1, wherein the scope of content that is accessible to the individual user device is filtered by a wireless router.

3. The computer program product of claim 2, wherein the scope of the content that is accessible to each local user device is filtered by blocking content from a uniform resource locator on a prohibited uniform resource locator list or by blocking content that includes an expression in a prohibited expression list.

4. The computer program product of claim 1, wherein the scope of content that is accessible to the individual user device is filtered by an Internet service provider.

5. The computer program product of claim 1, wherein the predetermined environmental condition includes a predetermined image, and wherein the environmental data received from the local user device is determined to satisfy the predetermined environmental condition in response to the environmental data including an image that matches the predetermined image.

6. The computer program product of claim 5, wherein the image included in the environmental data is captured by a camera of the individual local user device, and wherein the environmental data further includes a time stamp indicating when the image was captured.

7. The computer program product of claim 6, wherein the predetermined image is an image of the face of a predetermined supervisory user.

8. The computer program product of claim 1, wherein the predetermined environmental condition includes a predetermined short range wireless identification code of a predetermined supervisory user device, and wherein the environmental data received from the local user device is determined to satisfy the predetermined environmental condition in response to the environmental data including an identification code matching the predetermined short range wireless identification code.

9. The computer program product of claim 8, wherein the identification code included in the environmental data is captured by a short range wireless antenna of the individual local user device, and wherein the environmental data further includes a time stamp indicating when the identification code was captured.

10. The computer program product of claim 1, the program instructions further executable by the processor to:
return the current privilege level of the individual local user device to the base privilege level in response to detecting that the individual local user device no longer satisfies the predetermined environmental condition.

11. The computer program product of claim 1, the program instructions further executable by the processor to:
return the current privilege level of the individual local user device to the base privilege level in response to expiration of a timeout period since the current privilege level was escalated.

12. The computer program product of claim 1, wherein the individual local user device is prevented from accessing target content at the base privilege level and allowed to access the target content at the second privilege level.

13. The computer program product of claim 1, the program instructions further executable by the processor to:
store a privilege level for a local supervisory user device, wherein the predetermined environmental condition requires the environmental data show that the individual local user device is in the presence of the local supervisory user, and wherein the second privilege level for the individual local user device is the privilege level of the local supervisory user device.

14. The computer program product of claim 13, wherein the predetermined environmental condition includes a predetermined facial profile of the supervisory user, and wherein the environmental data received from the local user device is determined to satisfy the predetermined environmental condition in response to the environmental data including a current image that matches the predetermined facial profile of the supervisory user.

15. The computer program product of claim 13, wherein the predetermined environmental condition includes a predetermined short range wireless identification code of a predetermined supervisory user device, and wherein the environmental data received from the local user device is determined to satisfy the predetermined environmental condition in response to the environmental data including an identification code matching the predetermined short range wireless identification code.

16. The computer program product of claim 1, the program instructions further executable by the processor to:
identify, for each local user device, a unique identifier selected from the group consisting of a media access control address, an internet protocol address, and a combination thereof; and
store, for each local user device, the base privilege level of the local user device in association with the unique identifier of the local user device.

17. The computer program product of claim 1, wherein the predetermined environmental condition is the individual local user device being in the proximity of a local supervisory user device, and wherein the program instructions are further executable by the processor to:
receive first location coordinates from the individual local user device; and
receive second location coordinates from the local supervisory user device, wherein the individual local user device is determined to be in the proximity of a local supervisory user device in response to the distance between the first and second location coordinates being less than a setpoint distance.

18. The computer program product of claim 1, wherein the predetermined environmental condition is the individual local user device being in the proximity of a local supervisory user device, and wherein the program instructions are further executable by the processor to:

receive first location coordinates from the individual local user device; and receive second location coordinates from the local supervisory user device, wherein the individual local user device is determined to be in the proximity of a local supervisory user device in response to both the first and second location coordinates being within a predetermined range of location coordinates corresponding to a room of a building.

19. A computer program product comprising non-transitory computer readable storage media having program instructions embodied therewith, the program instructions executable by a processor to:

store a default address for a local user device in data storage of the local user device;

store a profile for a supervisor in the data storage of the local user device, wherein the profile includes a supervisory device address of a local supervisory user device associated with the supervisor;

receive current input from one or more input components of the local user device, wherein the current input indicates whether the local user device is in the proximity of the supervisor; and transmit a current device address and a request for content to a router, wherein the current device address is the default address for the local user device in response to determining that the local user device is not in the proximity of a supervisor, and wherein the current device address is the supervisory device address of the local supervisory user device in response to determining that the local user device is in the proximity of a supervisor.

20. The computer program product of claim 19, the program instructions executable by a processor to:

instantiate a virtual network interface card on the local user device using the supervisory device address;

route the request for content and network traffic resulting from the request for content over the virtual NIC using the supervisory device address.

* * * * *